Sept. 18, 1962  W. D. MANEY  3,054,303
SAFETY ATTACHMENT FOR VALVES
Filed March 23, 1961

INVENTOR.
William D. Maney
BY
Roberts, Cushman & Grover
ATT'YS 3,054,303
SAFETY ATTACHMENT FOR VALVES
William D. Maney, Northboro, Mass.
Filed Mar. 23, 1961, Ser. No. 97,847
4 Claims. (Cl. 74—504)

This invention relates to valves of the type comprising a valve casing, a rotatable stem projecting from one side of the casing, a non-circular part such as a hexagonal nut surrounding the stem at its inner end and, at its outer end, a handle which is usually circular and which has a plurality of openings extending therethrough lengthwise of the stem. In many cases such valves are opened or closed by children or other unauthorized persons, thereby causing inconvenience and sometimes damage. For example, in the case of valves leading from a tank to an oil burner in a basement, children playing in the basement sometimes close the valve thereby rendering the oil burner inoperative.

Objects of the present invention are to provide an attachment for such valves which is simple and economical in construction, which can be applied to standard valves without modifying the valves, which can be attached easily and quickly, which normally prevents rotation of the valve handle but which can be easily and quickly unlocked by an operator familiar with its construction.

According to the present invention the attachment comprises a lock having a base fitting over the aforesaid nut or other non-circular part of the valve to prevent rotation of the lock about the axis of the stem, the lock having a detent interengaging the valve handle to prevent rotation of the handle about the axis of the stem, the lock being slidable lengthwise of the stem to disengage it from the nut, thereby to permit rotation of the handle, stem and lock. In the preferred embodiment the base has a pair of arms extending from opposite edges thereof through openings on opposite sides of the valve handle. While the lock may be actuated by gravity it is preferably held in locking position by means of a spiral spring surrounding the stem between the aforesaid base and handle.

In a more specific aspect the invention involves a valve having a stem rotatable about its axis, a handle on the outer end of the stem, the handle having openings extending therethrough lengthwise of the stem, a nut surrounding the inner end of the stem, a lock having a base, the base having an opening fitting over said nut to prevent rotation of the lock about the aforesaid axis and having an arm extending through one of the aforesaid openings to prevent rotation of the handle about the axis, the lock being slidable lengthwise of the stem to disengage it from the nut, thereby to permit rotation of the handle, stem and lock.

Figure 1:
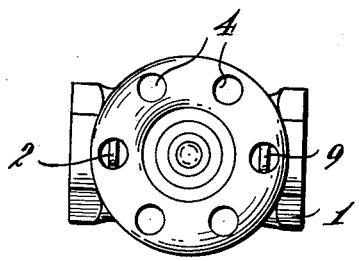
Figure 3:
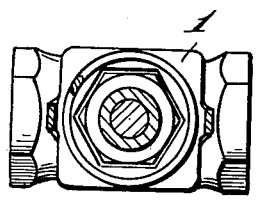
Figure 2:
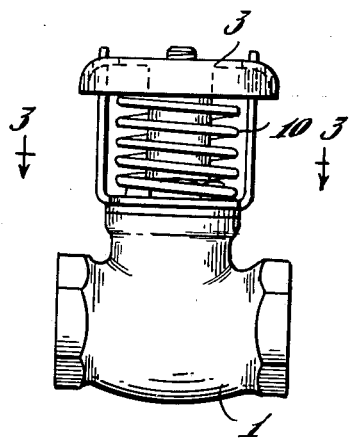
Figure 4:
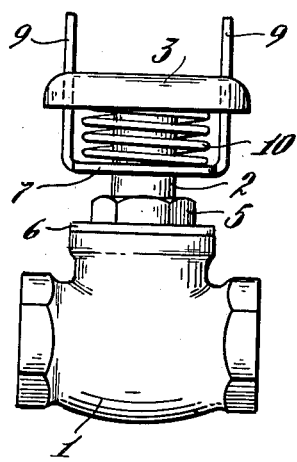
Figure 5:
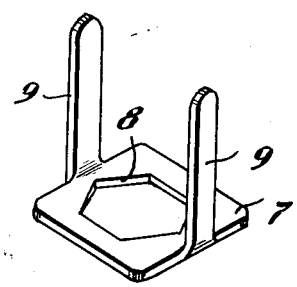

For the purpose of illustration a typical embodiment of the invention is shown in the accompanying drawings in which FIG. 1 is a plan view of a valve;
FIG. 2 is a side view of a valve;
FIG. 3 is a section on line 3—3 of FIG. 2;
FIG. 4 is a side view of the valve showing the lock in unlocked position; and
FIG. 5 is an isometric view of the lock.

The illustration comprises a valve casing, a stem 2, a handle 3 having openings 4 and a nut 5 surrounding the inner end of the stem and seating on the washer 6. Usually the handle is threaded on the outer end of the stem so that it can be removed by rotation in a counterclockwise direction.

The present invention involves a lock comprising a base 7 having a hexagonal opening 8 adapted to fit over the nut 5 and two arms 9 extending from opposite edges of the base through two handle openings 4 on opposite sides of the handle. Interposed between the lock and the handle is a spiral spring 10 which normally holds the lock in the locking position shown in FIG. 2. However by lifting the lock until the base clears the nut 5 the handle may be rotated to open or close the valve, after which the lock snaps back into locking position automatically.

It should be understood that the present disclosure is for the purpose of illustration only and that this invention includes all modifications and equivalents which fall within the scope of the appended claims.

I claim:

1. A valve comprising a stem rotatable about its axis, a handle on the outer end of the stem, the handle having openings extending therethrough lengthwise of the stem, a stationary nut surrounding the inner end of the stem, a lock having a base, the nut having a non-circular periphery and the base having an opening non-rotatably fitting over said nut to prevent rotation of the lock about said axis and having an arm extending through one of said openings to prevent rotation of the handle about said axis, said lock being slidable lengthwise of the stem to disengage it from said nut, thereby to permit rotation of the handle, stem and lock.

2. A valve according to claim 1 wherein said lock comprises a pair of arms extending from opposite edges of the base and extending through said openings and further characterized by a spiral spring fitting between said arms and compressed between said base and valve handle.

3. For use with a valve having a stem rotatable about its axis, a handle on the outer end of the stem, the handle having openings extending therethrough lengthwise of the stem and a stationary nut surrounding the inner end of the stem, an attachment comprising a base, the nut having a non-circular periphery and the base having an opening shaped to fit non-rotatably over said nut to prevent rotation of the lock about said axis and having an arm extending through one of said openings to prevent rotation of the handle about said axis, whereby the handle may be unlocked by sliding the attachment lengthwise of the stem to disengage it from said nut.

4. An attachment according to claim 3 further characterized in that the base has a second arm extending through an opening in the handle, said arms extending from opposite edges of the base.

References Cited in the file of this patent
UNITED STATES PATENTS

| | | |
|---|---|---|
| 577,897 | Walker | Mar. 2, 1897 |
| 1,762,195 | Roberts | June 10, 1930 |
| 1,999,457 | Hoehn | Apr. 30, 1935 |
| 2,189,654 | Rief | Feb. 6, 1940 |
| 2,225,236 | Shaw | Dec. 17, 1940 |
| 2,234,052 | Luenz | Mar. 4, 1941 |